May 24, 1927.
W. YOUNGMAN
1,629,900
COMBINATION SCARIFIER AND CLEANER
Filed July 3, 1926
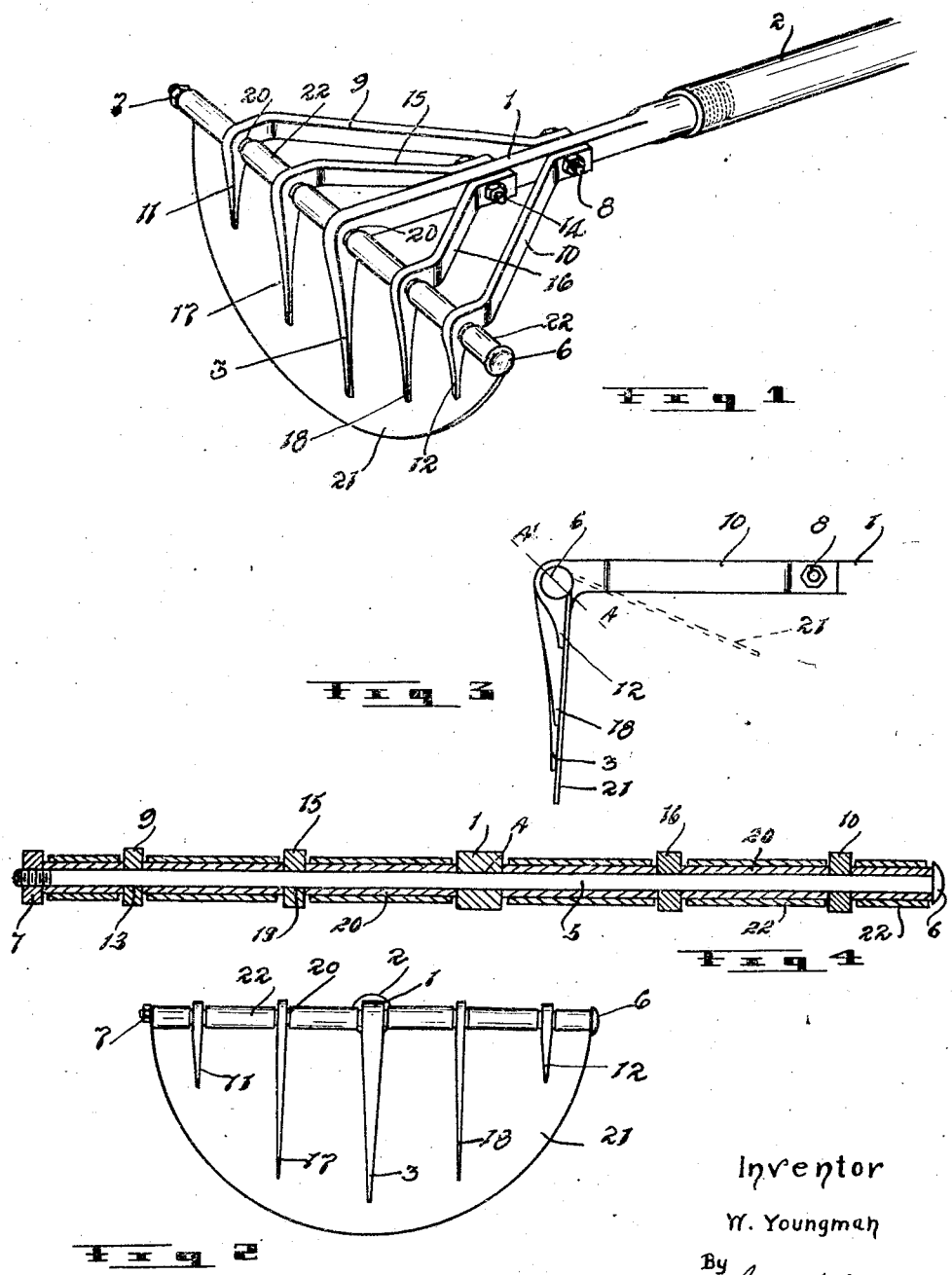

Patented May 24, 1927.

1,629,900

UNITED STATES PATENT OFFICE.

WALTER YOUNGMAN, OF WINNIPEG, MANITOBA, CANADA.

COMBINATION SCARIFIER AND CLEANER.

Application filed July 3, 1926. Serial No. 120,395.

The invention relates to improvements in combination scarifiers and cleaners and an object of the invention is to provide a hand tool which can be used for initially loosening dirt, debris and such like accumulating in pipes and by the further use of which the material so loosened can be scraped out of the pipe and the pipe so effectively cleaned.

A more particular object of the invention is to provide a device especially designed for cleaning out culvert pipes which embodies teeth for loosening any deposit in the pipe and a scraper or hoe-like plate for gathering up the loosened material and removing it from the culvert, the plate being so mounted that it swings back to permit the teeth to do their work and then swings ahead to gather the material loosened, the teeth acting in this latter position of the plate to reinforce the plate.

With the above more important objects in view, the invention consists essentially in the arrangement and construction of parts hereinafter more particularly described, reference being had to the accompanying drawing, in which:—

Fig. 1 is a perspective view of the complete device.

Fig. 2 is a front end view of the same.

Fig. 3 is a side view.

Fig. 4 is a cross sectional view through the head of the device, the section being taken in the plane denoted by the line 4—4 Figure 3.

In the drawing like characters of reference indicate corresponding parts in the several figures.

In constructing the device I provide a shank or central arm 1 which in the present instance has the rear end thereof screw threaded to receive a handle section 2 in the form of a pipe and which has the forward end flattened and turned downwardly and sharpened to provide a comparatively long central tooth 3. The head of the tooth is provided with a central opening 4 and through this opening I pass a comparatively long bolt 5 having one end fitted with a head 6 and the other end with a nut 7.

To the shank I secure by a bolt 8 the rear ends of a pair of forwardly diverging outer arms 9 and 10 which have their forward ends terminating in down turned outer teeth 11 and 12 which are comparatively short. The heads of these teeth are fitted with openings 13 to receive the bolt.

To the shank I also secure by a bolt 14, the rear ends of an intermediate pair of arms 15 and 16 and these have their forward ends also turned downwardly to provide teeth 17 and 18 which teeth are somewhat longer than teeth 11 and 12 and have their heads thereof provided with openings 19 to receive the bolt. The inner edges of the teeth are transversely aligned and the lower ends or points thereof are terminated in the arc of a circle, the centre point of which is located centrally of the head of the central tooth.

On the bolt between the teeth and at the outer sides of the heads of the outer teeth, I locate spacing sleeves 20 and obviously upon the nut 7 being tightened up, the sleeves will effectively jam the teeth and hold them all in a fixed position. A semi-circular scraper or hoe-like plate 21 is also provided and this plate is formed at its upper edge with curved projections 22 curled around the spacing sleeves and hingedly connecting the plate thereto. The extensions 22 are slightly shorter than the spacing sleeves so that they will not be jammed when the nut on the bolt is tightened up. The radius of the plate 21 is somewhat greater than the radius of the arc containing the points of the teeth, this being best shown in Figure 2.

I have herein shown only one handle section 2, but it will be understood that other pipe sections can be screwed to the free end of such section 2 to increase the length of the handle as desired for the work in hand.

The tool will be made in different sizes depending on the sizes of the different culverts met with as it is desirable that the tool used in any particular culvert be somewhat smaller than the diameter of the culvert to allow of the manipulation of the tool within the culvert.

The central outer and intermediate arms form a rigid head which carries the teeth and the hoe-like plate.

When this device is to be used on say a road culvert to clean out material accumulated therein such as dirt, sediment and so forth, it is passed into the end of the culvert and the teeth are pressed down to scarify or scrape and loosen the surface of the accumulated material and as the tool is going into the culvert, the plate swings freely backwardly to free the teeth to do their work. Obviously upon the tool being withdrawn from the culvert, the plate upon contact with the loosened material will initially swing back against the teeth and will then serve to gather the loosened material and carry it towards the end of the culvert upon the tool being pulled in that direction. The alternate scarifying and withdrawal of the loosened material is continued until the culvert is cleared of the accumulation. One can obviously work from both ends of the culvert so that the handle would only require to be sufficiently long to permit this being done. Whilst I have entered into a detailed description of the structure of the tool, it will be understood that this could be readily modified without departing from the spirit of the invention as set forth in the appended claims.

What I claim as my invention is:—

1. A combination scarifying and cleaning tool comprising a handle, stationary rake teeth on the end of said handle and a pivoted gathering plate associated with the teeth and adapted to swing away from the teeth upon the tool being moved in one direction and to swing towards and engage the teeth upon the tool being moved in the opposite direction.

2. A combination scarifying and cleaning tool comprising a head, a plurality of stationary down turned spaced teeth carried by the head and a hoe-like gathering member pivotally attached to the head and designed to swing away from the teeth upon the movement of the tool in one direction and to engage with and extend beyond the points of the teeth upon a movement in the other direction.

3. A combination scarifying and cleaning tool comprising a central shank, a plurality of transversely aligned spaced down turned teeth carried by the shank and a gathering plate having the upper edge thereof pivotally mounted in the spaces between the teeth, said plate being free to swing upwardly towards the shank when the tool is moved in one direction and to engage the teeth upon the tool being moved in the other direction.

4. In a combination scarifying and cleaning tool, a plurality of connected arms having their forward ends spaced apart and down turned and sharpened to provide spaced transversely aligned teeth, a bolt passing through the heads of the teeth and extending beyond the heads of the outer teeth, spacing sleeves mounted on the ends of the bolt and on the bolt between the heads of the teeth to space the latter and a hoe-like plate having the upper edge thereof provided with curled extensions of less length than the sleeves and passing therearound and hingedly supporting the plate in a position normally engaging the inner edges of the teeth.

5. A combination scarifying and cleaning tool for pipes comprising a handle, a plurality of transversely aligned spaced teeth on the end of the handle having their points contained in the arc of a circle and a hoe-like gathering member associated with the teeth and having the upper edge thereof pivotally mounted and the lower edge thereof contained in the arc of a circle, said member normally taking a position in contact with the inner edges of the teeth.

6. A combination scarifying and cleaning tool for pipes comprising a handle a plurality of transversely aligned spaced teeth on the end of the handle having their points contained in the arc of a circle and a hoe-like gathering member associated with the teeth and having the upper edge thereof pivotally mounted and the lower edge thereof contained in the arc of a circle, concentric to the former arc and of greater radius, said member normally taking a position in contact with the inner edges of the teeth.

Signed at Winnipeg, this 4th day of June, 1926.

WALTER YOUNGMAN.